(12) United States Patent
Hansen et al.

(10) Patent No.: US 8,126,877 B2
(45) Date of Patent: Feb. 28, 2012

(54) ARRANGING SEARCH ENGINE RESULTS

(75) Inventors: Richard Karl Hansen, Troy, NY (US);
Kevin D. Carey, Rensselaer, NY (US);
Nilanjana De, Waterford, NY (US);
Mark Richard Gaulin, Albany, NY (US)

(73) Assignee: GlobalSpec, Inc., East Greenbush, NY (US)

( * ) Notice: Subject to any disclaimer, the term of this patent is extended or adjusted under 35 U.S.C. 154(b) by 829 days.

(21) Appl. No.: 12/018,730

(22) Filed: Jan. 23, 2008

(65) Prior Publication Data

US 2009/0187557 A1    Jul. 23, 2009

(51) Int. Cl.
*G06F 17/30* (2006.01)
(52) U.S. Cl. .......................... 707/722; 707/752
(58) Field of Classification Search ........... 707/999.003, 707/999.005, 999.007, 722, 723, 728, 752
See application file for complete search history.

(56) References Cited

U.S. PATENT DOCUMENTS

| | | | | |
|---|---|---|---|---|
| 5,706,449 | A * | 1/1998 | Liu et al. | 715/823 |
| 6,078,866 | A * | 6/2000 | Buck et al. | 702/2 |
| 6,269,361 | B1 | 7/2001 | Davis et al. | 707/3 |
| 6,728,792 | B2 * | 4/2004 | Wagner | 710/6 |
| 6,834,122 | B2 * | 12/2004 | Yang et al. | 382/227 |
| 6,873,982 | B1 * | 3/2005 | Bates et al. | 707/737 |
| 7,231,358 | B2 | 6/2007 | Singh et al. | 705/14 |
| 7,283,997 | B1 * | 10/2007 | Howard et al. | 1/1 |
| 7,349,868 | B2 * | 3/2008 | Tenorio | 705/26.62 |
| 7,386,540 | B2 * | 6/2008 | Anderson et al. | 1/1 |
| 7,421,428 | B2 * | 9/2008 | Lunenfeld | 1/1 |
| 7,505,973 | B2 * | 3/2009 | Kapadia et al. | 1/1 |
| 7,516,086 | B2 * | 4/2009 | Chu et al. | 705/14.71 |
| 7,519,595 | B2 * | 4/2009 | Solaro et al. | 1/1 |
| 7,657,555 | B2 * | 2/2010 | Rorex et al. | 707/999.102 |
| 7,689,466 | B1 * | 3/2010 | Benbrahim et al. | 705/26.1 |
| 7,702,618 | B1 * | 4/2010 | Patterson | 707/999.003 |
| 7,739,285 | B2 * | 6/2010 | Faerber et al. | 707/737 |
| 7,836,040 | B2 * | 11/2010 | Lee | 707/706 |
| 7,966,309 | B2 * | 6/2011 | Shacham et al. | 707/708 |
| 2001/0047354 | A1 * | 11/2001 | Davis et al. | 707/3 |
| 2002/0099605 | A1 * | 7/2002 | Weitzman et al. | 705/14 |
| 2003/0028520 | A1 * | 2/2003 | Alpha | 707/2 |
| 2003/0037074 | A1 | 2/2003 | Dwork et al. | 707/500 |
| 2003/0046098 | A1 | 3/2003 | Kim | 705/1 |
| 2003/0126130 | A1 * | 7/2003 | Martino et al. | 707/7 |
| 2003/0216930 | A1 | 11/2003 | Dunham et al. | 705/1 |

(Continued)

OTHER PUBLICATIONS

Wu et al., "Evaluation Score Normalization Methods in Data Fusion", in Proceeding of Asia Information Retrieval Symposium (AIRS) 2006, 7 pages.*

(Continued)

*Primary Examiner* — Hung T Vy
*Assistant Examiner* — Phuong Thao Cao
(74) *Attorney, Agent, or Firm* — Wayne F. Reinke, Esq.; Heslin Rothenberg Farley & Mesiti P.C.

(57) ABSTRACT

Search engine results arranged according to one or more first criteria (e.g., relevancy) are obtained. The results are assigned groups within chosen or calculated relevancy ranges. The results are then resorted within each group according to one or more second criteria (e.g., payment). The groups maintain original placement relative to each other during resorting. A list of at least some of the resorted results is then created for various uses, including search or further manipulation.

18 Claims, 3 Drawing Sheets

U.S. PATENT DOCUMENTS

| | | | |
|---|---|---|---|
| 2003/0217059 A1 | 11/2003 | Allen et al. | 707/10 |
| 2003/0220918 A1 | 11/2003 | Roy et al. | 707/3 |
| 2003/0233360 A1* | 12/2003 | Tan | 707/7 |
| 2004/0039733 A1 | 2/2004 | Soulanille | 707/3 |
| 2004/0088241 A1 | 5/2004 | Rebane et al. | 705/37 |
| 2004/0093321 A1* | 5/2004 | Roustant et al. | 707/3 |
| 2005/0060310 A1* | 3/2005 | Tong et al. | 707/7 |
| 2005/0080769 A1* | 4/2005 | Gemmell et al. | 707/3 |
| 2005/0080770 A1* | 4/2005 | Lueder et al. | 707/3 |
| 2005/0125397 A1* | 6/2005 | Gross et al. | 707/3 |
| 2005/0149396 A1 | 7/2005 | Horowitz et al. | 705/14 |
| 2005/0154717 A1* | 7/2005 | Watson et al. | 707/3 |
| 2005/0198070 A1 | 9/2005 | Lowry | 707/104.1 |
| 2005/0246322 A1 | 11/2005 | Ravikumar et al. | 707/3 |
| 2006/0020587 A1 | 1/2006 | Kausik | 707/3 |
| 2006/0026643 A1* | 2/2006 | Silverberg et al. | 725/46 |
| 2006/0064020 A1* | 3/2006 | Burnes et al. | 600/481 |
| 2006/0064411 A1 | 3/2006 | Gross et al. | 707/3 |
| 2006/0085408 A1* | 4/2006 | Morsa | 707/3 |
| 2006/0161545 A1* | 7/2006 | Pura | 707/7 |
| 2006/0206455 A1* | 9/2006 | Kronberg | 707/3 |
| 2006/0212441 A1 | 9/2006 | Tang et al. | 707/5 |
| 2006/0212447 A1* | 9/2006 | Davis et al. | 707/6 |
| 2006/0218111 A1* | 9/2006 | Cohen | 706/45 |
| 2006/0248035 A1* | 11/2006 | Gendler et al. | 707/1 |
| 2006/0253434 A1 | 11/2006 | Beriker et al. | 707/3 |
| 2007/0041623 A1* | 2/2007 | Roehrig et al. | 382/128 |
| 2007/0073658 A1* | 3/2007 | Faerber et al. | 707/3 |
| 2007/0156747 A1* | 7/2007 | Samuelson et al. | 707/102 |
| 2007/0174257 A1* | 7/2007 | Howard | 707/3 |
| 2007/0250488 A1* | 10/2007 | Lee | 707/3 |
| 2007/0266001 A1* | 11/2007 | Williams et al. | 707/2 |
| 2008/0010276 A1* | 1/2008 | Morton et al. | 707/5 |
| 2008/0059460 A1* | 3/2008 | Lunenfeld | 707/5 |
| 2008/0109285 A1* | 5/2008 | Reuther et al. | 705/7 |
| 2008/0133298 A1* | 6/2008 | McQueen et al. | 705/7 |
| 2008/0172374 A1* | 7/2008 | Wolosin et al. | 707/5 |
| 2008/0189269 A1* | 8/2008 | Olsen | 707/5 |
| 2008/0263025 A1* | 10/2008 | Koran | 707/5 |
| 2009/0171721 A1* | 7/2009 | LeBaron et al. | 705/7 |
| 2009/0259660 A1* | 10/2009 | Novy | 707/7 |
| 2011/0029925 A1* | 2/2011 | Robert et al. | 715/830 |

OTHER PUBLICATIONS

"Being Frank about Search Engine Rank," FTC Consumer Alert, Federal Trade Commission, Protecting America's Consumers, Sep. 2002 (1 page), available at http://www.ftc.gov/bcp/conline/pubs/alerts/searchalrt.shtm.

"Cloaking" definition (9 pages)—available at http://www.submitawebsite.com/seo_glossary.html, Jul. 18, 2007.

"How a search engine creates revenue" (6 pages)—available at http://techrepublic.com.com/5208-6230-0.html?forumID=75&threadID=177710&messageID=1810853, Jul. 18, 2007.

Danny Sullivan, "Buying Your Way In: Search Engine Advertising Chart," Mar. 22, 2007 (5 pages)—available at http://searchenginewatch.com/showPage.html?page=2167941.

* cited by examiner

ARRANGING SEARCH ENGINE RESULTS

BACKGROUND OF THE INVENTION

1. Technical Field

The present invention generally relates to arranging search engine results that include paid and unpaid results. More particularly, the present invention relates to arranging search engine results to bias according to one or more first criteria, while also taking one or more second criteria into account.

2. Background Information

Search engines have become the dominant method of finding information on the Internet. However, while search engine services have proved to be invaluable, the providers of such services have struggled over time with how best to provide the service, while still making a reasonable return on the effort. One of the approaches developed to address the issue is paid search results.

In the existing, basic model for paid search, an advertiser chooses one or more search terms that will trigger a search result that includes a hyperlink to the advertiser's Web site. The search result is placed in a prominent position in the list of typically relevance-based results. If the searcher clicks on the link, a payment is made to the search service. This paid search model is known as pay-per-click. No other criteria besides payment are considered in determining placement of the paid result. In the basic model, unpaid results come after paid results in the list.

While it is understandable that a search engine provider would want to receive a return for their efforts in indexing search terms and results, arrangement of search results based solely on payment can lead to results that, for example, may not be relevant to the search and thereby cause the user to waste time.

Thus, a need exists for a way to improve search engine results over the basic paid model. More generally, a need exists for a way to bias according to criteria beyond relevance while still taking relevance into account.

SUMMARY OF THE INVENTION

Briefly, the present invention satisfies the need to improve search engine results over the basic paid model by biasing search results according to a first criteria (e.g., relevance), grouping results similarly satisfying the first criteria, then sorting within the groups according to a second criteria (e.g., payment). In this way, the biasing according to the second criteria is not completely at the expense of the first criteria.

The present invention provides, in a first aspect, a method of arranging search engine results. The method comprises obtaining by at least one processor a plurality of search engine results sorted according to at least one first criteria. The method further comprises grouping by at least one processor the sorted plurality of search engine results into at least two groups according to the at least one first criteria without rearranging the sorted plurality of search engine results, sorting by at least one processor within each of the at least two groups according to at least one second criteria while maintaining relative placement of the at least two groups, creating by at least one processor a list of at least some of the plurality of search engine results in accordance with the sorting, the at least one first criteria comprising relevancy, wherein each group comprises a different range of normalized relevancy scores, and wherein the grouping comprises determining a group for a given result according to the formula $(N-S)/B$ where $N$=maximum possible normalized score for the at least one first criteria, $S$=normalized score of the given result for the at least one first criteria, and $B$=a predetermined range size of normalized scores for each group.

The present invention provides, in a second aspect, a method of arranging search engine results. The method comprises obtaining by at least one processor a plurality of search engine results sorted according to relevancy, the plurality of search engine results including at least one paid result and at least one unpaid result. The method further comprises grouping by at least one processor the sorted plurality of search engine results into at least two groups according to relevancy range without rearranging the sorted plurality of search engine results, and sorting by at least one processor within each of the at least two groups according to payment amount while maintaining relative placement of the at least two groups. Within each of the at least two groups, any results with no associated payment amount are placed below results with an associated payment amount. The method further comprises creating by at least one processor a list of at least some of the plurality of search engine results in accordance with the sorting. In addition, the obtaining, the grouping, the sorting and the creating are performed in real time.

System and computer program products corresponding to the above-summarized methods are also described and claimed herein.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In its preferred form, the invention comprises a method of sorting search engine results to bias according to payment, while still taking relevance into account. The method breaks conventional search results from a search engine, sorted by descending relevance (a first criteria), into at least two groups of results with similar relevancy scores. The search engine, in one example, defines what is considered "similar," with some examples given in the next paragraph. Within each group, the results are resorted by descending payment amount. The groups maintain their positions relative to the other groups; the only movement, if any, is within a group. The type of payment being compared could be, for example, pay-per-click fees, but could be other types. A list of at least some of the resorted results is then created (e.g., a page of results). In this way, bias can be given to paid results as between roughly equivalent results in terms of relevancy, while not straying too far from the original relevance-only ranking.

Group placement can be based, for example, on a predetermined range of normalized relevancy scores (e.g., where scores are normalized to 100 scale, scores 91-100 can be in one group, scores 81-90 in another, etc.). Preferably, however, group placement can be determined by choosing a block size B (e.g., 10, 11, 15, etc.), then determining which group a given result falls in using a formula, assuming normalized scores. In general, the larger the block size, the more weight is given to payment at the cost of relevancy. In this way, a desired level of weighting can be given for the second criteria, in this case, payment.

As used herein, the term "real time" refers to a level of computer responsiveness that a user senses as sufficiently immediate or that enables the computer to keep up with some external process (for example, to present visualizations of the weather as it constantly changes). Real-time is an adjective pertaining to computers or processes that operate in real time. Real time describes a human, rather than a machine, sense of time.

As used herein, the term "paid results" refers to a search result associated with an entity under an obligation to compensate one or more entities associated with providing the search result. Conversely, an "unpaid result" is a search result other than a paid result.

Figure 1:
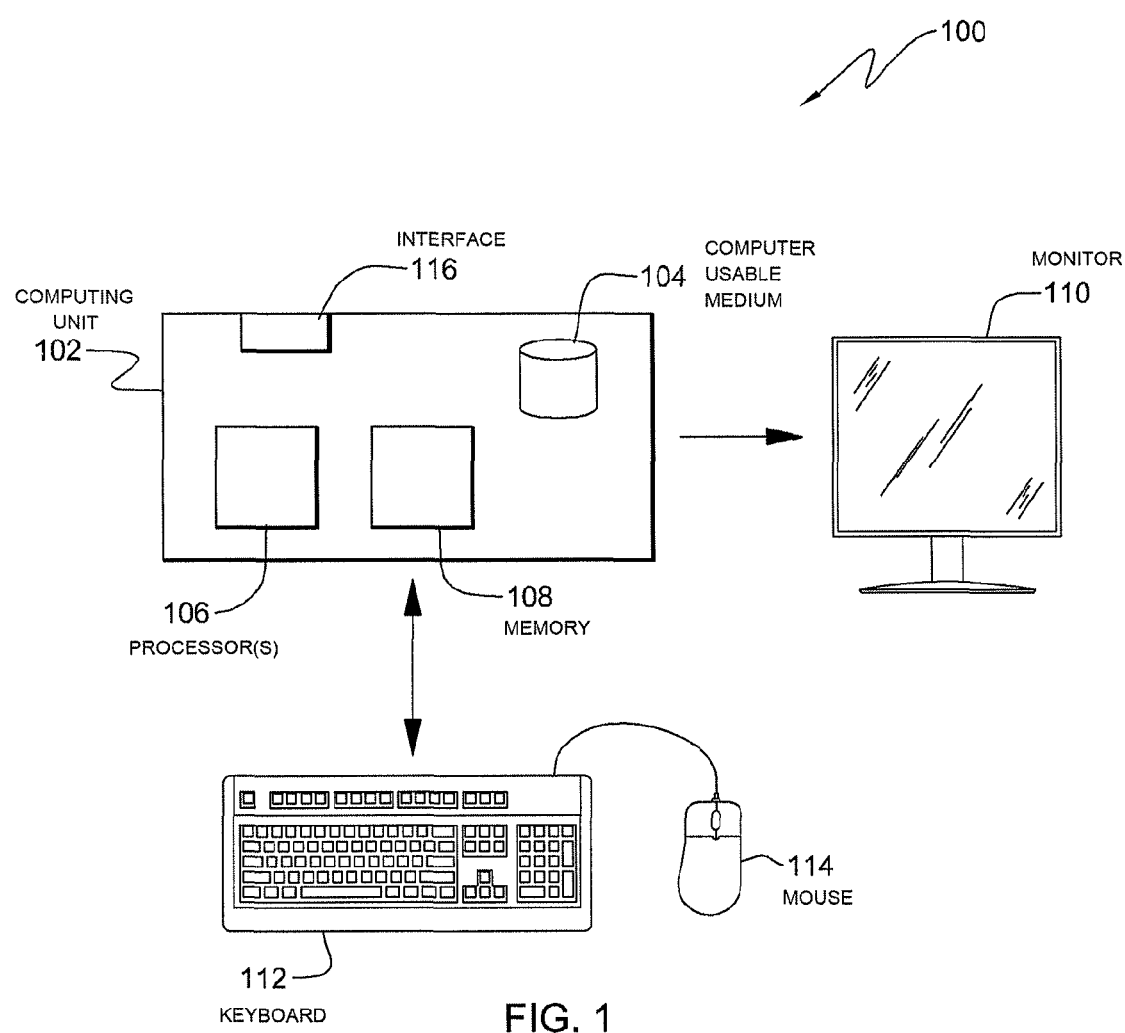
FIG. 1 is a block diagram of one example of a computing environment implementing one or more aspects of the present invention.

FIG. 1 is a block diagram of one example of a computing environment 100 implementing the present invention. The computing environment comprises a computing unit 102, which includes, for example, an operating system stored on a computer useable medium 104, one or more processors 106, memory 108 (e.g., RAM), and some type of user interface. For example, the user interface can comprise a monitor 110, keyboard 112 and pointing device (e.g., mouse 114). In addition, computing unit 102 may include an interface 116 for network communications. For example, interface 116 may comprise a network interface card or other wired connection, or a wireless connection (e.g., IEEE 802.11a, b, g or n standards). The network may comprise any type of private or public network. An example of a private network is a local area network or LAN. An example of a public network is the Internet. Optionally, the connection can be encrypted or otherwise made secure, particularly where a public network is used, for example, using SSL (secure sockets layer) encryption.

Figure 2:
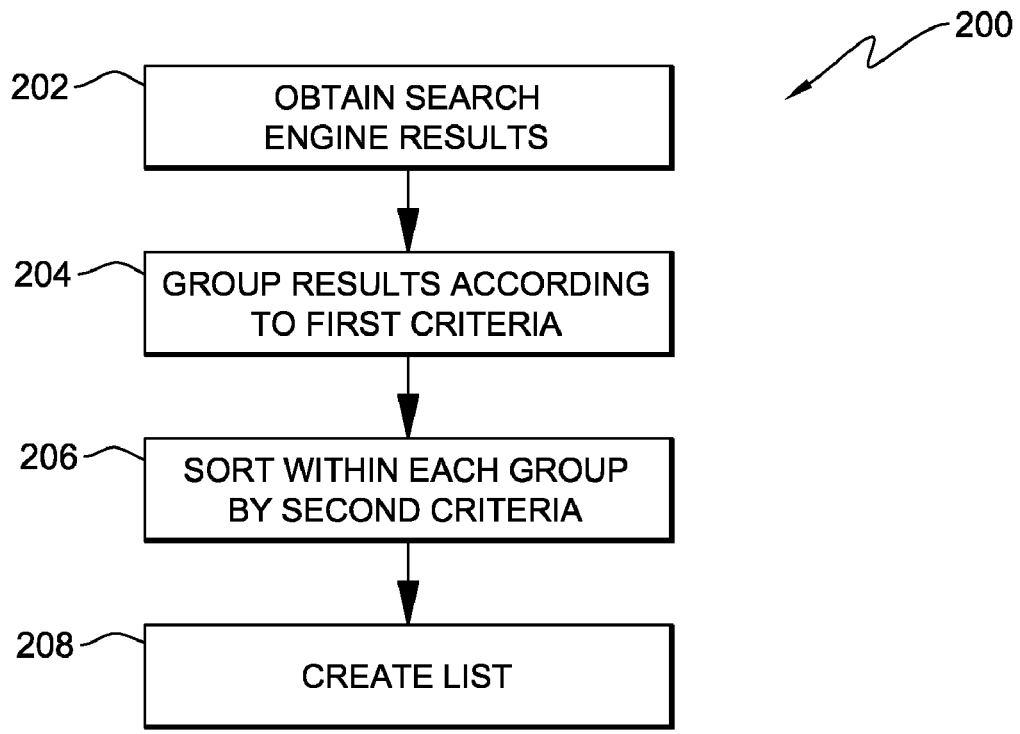
FIG. 2 is a flow diagram of one example of a method of arranging search engine results, in accordance with an aspect of the present invention.

FIG. 2 is a flow diagram 200 of one example a method of arranging search engine results, in accordance with an aspect of the present invention. The method comprises obtaining (by taking action or receiving) a plurality of search engine results sorted according to at least one first criteria, Step 202. The plurality of search engine results may include, for example, at least one paid result and at least one unpaid result. The method further comprises grouping the sorted plurality of search engine results into at least two groups according to the at least one first criteria, Step 204. The relative placement of the groups is maintained. In other words, the grouping aspect is performed without any rearrangement of the search engine results. Within each of the groups, the grouped results are sorted according to at least one second criteria, Step 206. Finally, the method comprises creating a list of at least some of the plurality of search engine results in accordance with the sorting, Step 208. Note that "list" includes, e.g., strict list as well as other visual and/or audio arrangements indicating ordering.

In one example, the at least one first criteria comprises relevancy, and the at least one second criteria comprises a payment amount. Of course, the criteria could be different and need not be static, but could be changed dynamically. Preferably, any result within a given group not satisfying the second criteria, i.e., is either unpaid or paid less than a threshold amount, are placed in a less prominent position than results satisfying the at least one second criteria and the at least one first criteria. In the case of a list, for example, placement in a less prominent position may comprise placement lower on the list. However, it will be understood that prominence with respect to placement may be dictated by considerations in addition to or other than location in a list. For example, there may be an additional, second placement in a more prominent location on the page showing the listing, or some other placement consideration(s).

In another example, the groups may be of a predefined size. Further, subsequent to the sorting there may be other or additional considerations for prominence. Thus, a change in position of one or more of the results after the sorting may be desirable. For example, after the sorting, an entity associated with a given search engine result may take some action causing the purveyor of the search engine service to want or need to change the position of one or more results. For example, if the entity associated with a search engine result decided to pay more for placement, or failed to pay past due amounts, then a change of position outside the main arrangement method may be desirable.

Preferably, the method of arranging search engine results is performed in real time. Thus, a user entering a search into a search engine enters a query, and receives the listing of results as normal. However, between those two events, entering and receiving, the method is performed such that the search results presented to the user are arranged according to the invention.

Figure 3:
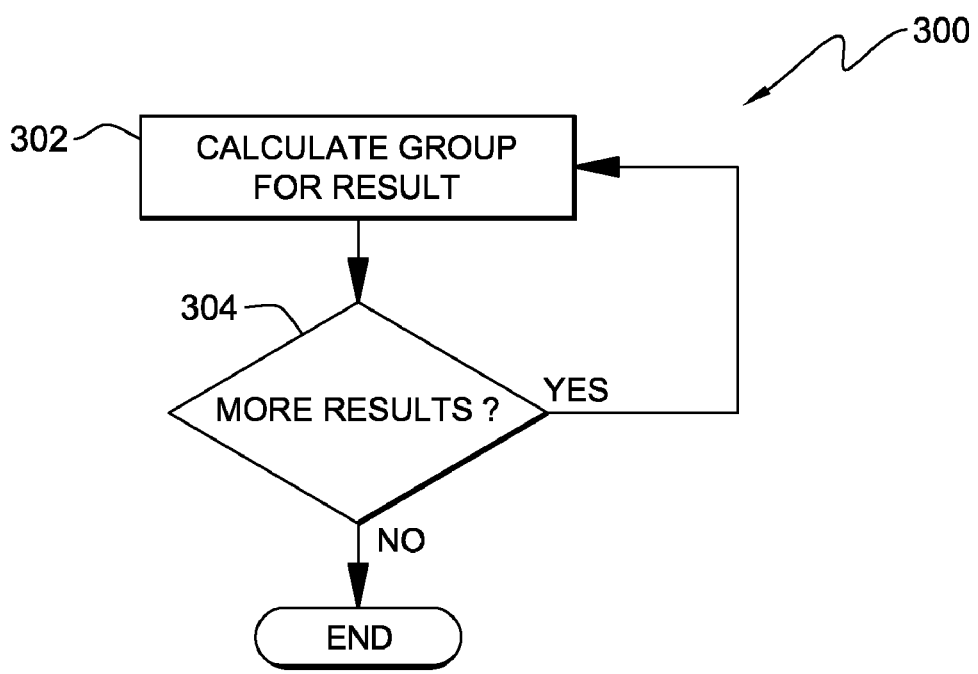
FIG. 3 is a flow diagram of one example of the grouping aspect of the method described with respect to FIG. 2.

FIG. 3 is a flow diagram of one example of the grouping aspect of the method described with respect to FIG. 2. In this example, it is assumed that the at least one first criteria comprises relevancy, and that each group comprises a different range of normalized relevancy scores. In the present example, the scores were normalized using 100 as the maximum possible score, and scaling all results accordingly. In this case, the grouping aspect comprises determining a group for a given result according to the formula (N−S)/B, where N is the maximum normalized score for the at least one first criteria, S is the normalized score of the given results for the at least one first criteria and B is the predetermined range size of normalized scores for each group. Thus, the flow diagram 300 of FIG. 3 depicts calculating a group score for a given result, Step 302. The calculation is done in accordance with the formula for each group, Inquiry 304. In this way, each search engine result is assigned a group prior to the sorting.

It will be understood with respect to FIG. 3 that the number of results obtained for which group calculations are performed may be more than the number of results included in the list. It will also be understood that other methods to normalize scores could be used, including using a scale other than 100, or, depending on the scoring method and the purpose, normalizing may not even be necessary. For example, another way to normalize is to set the highest score as 100 and the lowest as zero, scaling the remaining results to fit between them.

An example of the operation of the present invention will now be provided. Assume a search is done for the part number "ABC," and that the results are sorted by relevancy (normalized to 100 scale) as shown in Table 1 below.

TABLE 1

| Title | ActualScore | NormalizedScore | Company | Paid? |
|---|---|---|---|---|
| ABC | 2400 | 100 | "company a" | no |
| ABC | 2290 | 95 | "company b" | yes |
| ABC | 2280 | 95 | "company c" | no |
| ABC5 | 2032 | 87 | "company d" | no |

TABLE 1-continued

| Title | ActualScore | NormalizedScore | Company | Paid? |
|---|---|---|---|---|
| ABC2 | 2032 | 87 | "company d" | no |
| ABC4 | 2032 | 87 | "company e" | yes |
| ABC3 | 2032 | 87 | "company f" | no |

Assume that payment is a fixed amount for simplicity, and that a block group size of 11 is chosen. Note that the choice of block size may require testing to determine a desired "fit," which may of course differ for different search result providers and/or purposes, and may even depend on other factors. Such factors may include, for example, the search term itself, an expected number of search results, an expected number of paid/unpaid search results for a given search term, and/or business factors related or unrelated to the search term.

Next, we calculate the group number according to a formula, for example, $$Group = (N-S)/B$$

where each group comprises a different range of normalized relevancy scores, and where N=maximum possible normalized score for the at least one first criteria, relevancy in this example, S=normalized score of the given result for the at least one first criteria, and B=a predetermined range size of normalized scores for each group. The results from Table 1 with assigned blockgroup are shown in Table 2 below:

TABLE 2

| Title | ActualScore | NormalizedScore | Company | Paid? | blockgroup |
|---|---|---|---|---|---|
| ABC | 2400 | 100 | "company a" | no | 0 |
| ABC | 2290 | 95 | "company b" | yes | 0 |
| ABC | 2280 | 95 | "company c" | no | 0 |
| ABC5 | 2032 | 87 | "company d" | no | 1 |
| ABC2 | 2032 | 87 | "company d" | no | 1 |
| ABC4 | 2032 | 87 | "company e" | yes | 1 |
| ABC3 | 2032 | 87 | "company f" | no | 1 |

As can be seen from the Table 2, the group number is an integer, while the value of (N−S)/B may include a fractional remainder. Preferably, any fractional remainder is discarded or rounded down.

Next, the results are sorted by blockgroup ascending, then within each group by payment descending, and then normalized score descending, as shown in Table 3. It will be understood, however, that the choice of ascending/descending could be different for different purposes.

TABLE 3

| Title | ActualScore | NormalizedScore | Company | Paid? | blockgroup |
|---|---|---|---|---|---|
| ABC | 2290 | 95 | "company b" | yes | 0 |
| ABC | 2400 | 100 | "company a" | no | 0 |
| ABC | 2280 | 95 | "company c" | no | 0 |
| ABC4 | 2032 | 87 | "company e" | yes | 1 |
| ABC5 | 2032 | 87 | "company d" | no | 1 |
| ABC2 | 2032 | 87 | "company d" | no | 1 |
| ABC3 | 2032 | 87 | "company f" | no | 1 |

As shown in Table 3, paid results are given prevalence, but only within each block group. Thus, doing so does not come completely at the cost of relevancy. Instead, it is a middle ground balancing the two criteria.

In general, the larger the block size chosen, the more bias will be given to payment at the expense of relevance. For example, choosing a block size of 13 or more in the example above would move the "company e" result to entry # 2 in the results list. Thus, choosing block size balances the competing criteria.

Figure 4:
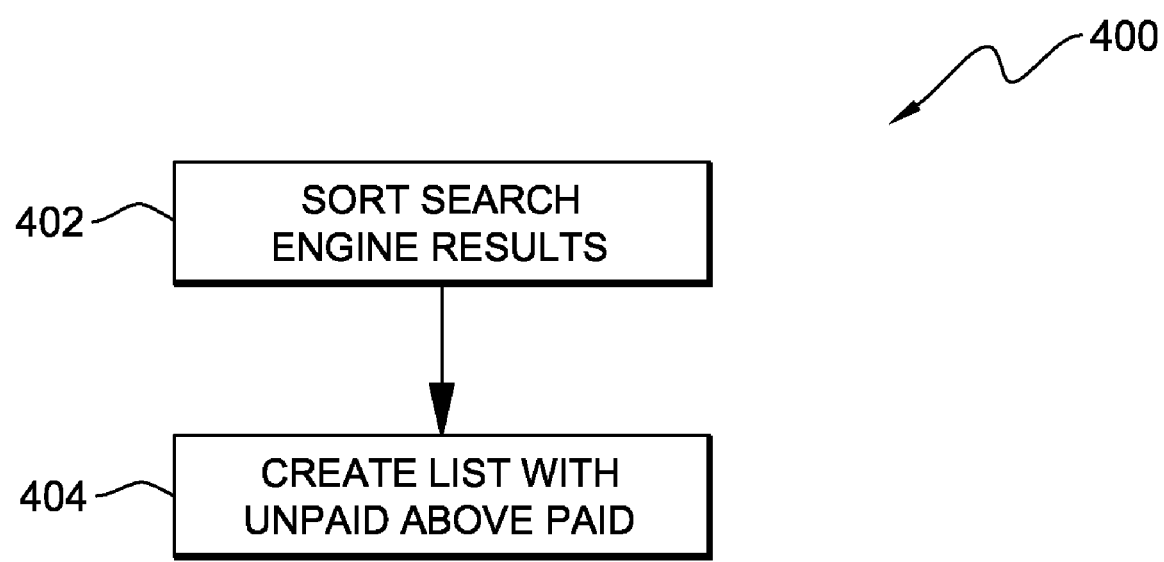
FIG. 4 is a flow diagram of another example of a method of arranging search engine results, in accordance with another aspect of the present invention.

FIG. 4 is a flow diagram 400 of another example of a method of arranging search engine results, in accordance with another aspect of the present invention. The method shown in FIG. 4 comprises sorting a plurality of search engine results, Step 402. The plurality of search engine results comprises at least one paid result and at least one unpaid result. The method further comprises creating a list of at least some of the plurality of search engine results in accordance with the sorting, Step 404. At least one unpaid result appears in the list created in a more prominent position in the list than a paid result. An example of this is shown in Table 3 above, where companies a and c appear above company e. In the basic paid model, this would not happen, since all paid results appear ahead of unpaid results, regardless of other factors.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or provided separately.

An article of manufacture or a computer program product incorporating one or more aspects of the present invention includes, for instance, one or more computer usable media to store computer readable program code means or logic thereon to provide and facilitate one or more aspects of the present invention. The medium can be an electronic, magnetic, optical, electro-magnetic, infrared, or semiconductor system (or apparatus or device) or a propagation medium. Examples of a computer readable medium include a semiconductor or solid state memory (e.g., flash memory), magnetic tape, a removable computer diskette, random access memory (RAM), read-only memory (ROM), a rigid magnetic disk and an optical disk. Examples of optical disks include compact disk-read only memory (CD-ROM), compact disk-read/write (CD-R; CD-R/W), DVD (e.g., DVD+/−R; DVD+/−R/W; DVD-RAM; DVD DL), and high-definition DVD (e.g., Blu-ray or HD-DVD).

A sequence of program instructions or a logical assembly of one or more interrelated modules defined by one or more computer readable program code means or logic preferably direct the performance of one or more aspects of the present invention. Alternatively, the present invention can be implemented in hardware, e.g., integrated circuit logic.

Advantageously, the present invention provides segmentation of search results sorted according to one or more first criteria into groups of similarly scored or rated results. Resorting only within the groups by one or more second criteria biases without ignoring the first criteria. No re-indexing is therefore needed, saving time, money and resources.

Although various embodiments are described above, these are only examples. Other variations are possible.

Moreover, a computing environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A method of arranging search engine results, comprising:
   obtaining by at least one processor a plurality of search engine results sorted according to relevancy, wherein the plurality of search engine results include at least one paid result and at least one unpaid result;
   grouping by at least one processor the sorted plurality of search engine results into at least two groups according to relevancy range without rearranging the sorted plurality of search engine results;
   sorting by at least one processor within each of the at least two groups according to payment amount while maintaining relative placement of the at least two groups, wherein within each of the at least two groups any unpaid results are placed below paid results; and
   creating by at least one processor a list of at least some of the plurality of search engine results in accordance with the sorting, wherein the obtaining, the grouping, the sorting and the creating are performed in real time;
   wherein each group comprises a different range of normalized relevancy scores, and wherein the grouping comprises determining a group for a given result according to the formula (N−S)/B where N=maximum possible normalized score for the at least one first criteria, S=normalized score of the given result for the at least one first criteria, and B=a predetermined range size of normalized scores for each group.

2. The method of claim 1, wherein the at least two groups are of predefined size.

3. The method of claim 1, further comprising changing a position of one or more results after the sorting.

4. The method of claim 1, wherein the obtaining, the grouping, the sorting and the creating are performed for a page of search engine results.

5. An article of manufacture comprising:
   at least one computer readable storage medium encoded with computer readable program code logic to facilitate arranging search engine results, said computer readable program code logic when executing performing the following:
      obtaining a plurality of search engine results sorted according to relevancy, wherein the plurality of search engine results include at least one paid result and at least one unpaid result;
      grouping the sorted plurality of search engine results into at least two groups according to relevancy range without rearranging the sorted plurality of search engine results;
      sorting within each of the at least two groups according to payment amount while maintaining relative placement of the at least two groups, wherein within each of the at least two groups any unpaid results are placed below paid results; and
      creating a list of at least some of the plurality of search engine results in accordance with the sorting, wherein the obtaining, the grouping, the sorting and the creating are performed in real time;
      wherein each group comprises a different range of normalized relevancy scores, and wherein the grouping comprises determining a group for a given result according to the formula (N−S)/B where N=maximum possible normalized score for the at least one first criteria, S=normalized score of the given result for the at least one first criteria, and B=a predetermined range size of normalized scores for each group.

6. The article of manufacture of claim 5, wherein the at least two groups are of predefined size.

7. The article of manufacture of claim 5, further comprising changing a position of one or more results after the sorting.

8. The article of manufacture of claim 5, wherein the obtaining, the grouping, the sorting and the creating are performed for a page of search engine results.

9. A system to arrange search engine results, the system comprising:
   at least one processor to obtain a plurality of search engine results sorted according to relevancy, wherein the plurality of search engine results include at least one paid result and at least one unpaid result;

at least one processor to group the sorted plurality of search engine results into at least two groups according to relevancy range without rearranging the sorted plurality of search engine results;

at least one processor to sort within each of the at least two groups according to payment amount while maintaining relative placement of the at least two groups, wherein within each of the at least two groups any unpaid results are placed below paid results; and at least one processor to create a list of at least some of the plurality of search engine results in accordance with the sorting, wherein the at least one processor to obtain, the at least one processor to group, the at least one processor to sort, and the at least one processor to create process in real time;

wherein each group comprises a different range of normalized relevancy scores, and wherein the grouping comprises determining a group for a given result according to the formula $(N-S)/B$ where $N$=maximum possible normalized score for the at least one first criteria, $S$=normalized score of the given result for the at least one first criteria, and $B$=a predetermined range size of normalized scores for each group.

10. The system of claim 9, wherein the at least two groups are of predefined size.

11. The system of claim 9, further comprising at least one processor to change a position of one or more results after the sorting.

12. The system of claim 9, wherein the at least one processor to obtain in real time comprises at least one processor to obtain in real time a page comprising the plurality of search engine results.

13. A method of arranging search engine results, comprising:

obtaining by at least one processor a plurality of search engine results sorted according to at least one first criteria, wherein the at least one first criteria comprises relevancy;

grouping by at least one processor the sorted plurality of search engine results into at least two groups according to the at least one first criteria without rearranging the sorted plurality of search engine results;

sorting by at least one processor within each of the at least two groups according to at least one second criteria while maintaining relative placement of the at least two groups; and creating by at least one processor a list of at least some of the plurality of search engine results in accordance with the sorting;

wherein each group comprises a different range of normalized relevancy scores, and wherein the grouping comprises determining a group for a given result according to the formula $(N-S)/B$ where $N$=maximum possible normalized score for the at least one first criteria, $S$=normalized score of the given result for the at least one first criteria, and $B$=a predetermined range size of normalized scores for each group.

14. The method of claim 13, wherein the at least one second criteria comprises a payment amount.

15. An article of manufacture comprising:

at least one computer readable storage medium encoded with computer readable program code logic to facilitate arranging search engine results, said computer readable program code logic when executing performing the following:

obtaining a plurality of search engine results sorted according to at least one first criteria, wherein the at least one first criteria comprises relevancy;

grouping the sorted plurality of search engine results into at least two groups according to the at least one first criteria without rearranging the sorted plurality of search engine results;

sorting within each of the at least two groups according to at least one second criteria while maintaining relative placement of the at least two groups; and creating a list of at least some of the plurality of search engine results in accordance with the sorting;

wherein each group comprises a different range of normalized relevancy scores, and wherein the grouping comprises determining a group for a given result according to the formula $(N-S)/B$ where $N$=maximum possible normalized score for the at least one first criteria, $S$=normalized score of the given result for the at least one first criteria, and $B$=a predetermined range size of normalized scores for each group.

16. The article of manufacture of claim 15, wherein the at least one second criteria comprises a payment amount.

17. A system to arrange search engine results, the system comprising:

at least one processor to obtain a plurality of search engine results sorted according to at least one first criteria, wherein the at least one first criteria comprises relevancy;

at least one processor to group the sorted plurality of search engine results into at least two groups according to the at least one first criteria without rearranging the sorted plurality of search engine results;

at least one processor to sort within each of the at least two groups according to at least one second criteria while maintaining relative placement of the at least two groups; and at least one processor to create a list of at least some of the plurality of search engine results in accordance with the sorting;

wherein each group comprises a different range of normalized relevancy scores, and wherein the grouping comprises determining a group for a given result according to the formula $(N-S)/B$ where $N$=maximum possible normalized score for the at least one first criteria, $S$=normalized score of the given result for the at least one first criteria, and $B$=a predetermined range size of normalized scores for each group.

18. The system of claim 17, wherein the at least one second criteria comprises a payment amount.

* * * * *